(12) United States Patent
Akin et al.

(10) Patent No.: US 11,596,963 B2
(45) Date of Patent: Mar. 7, 2023

(54) IN-CANOPY SPRINKLER MONITORING SYSTEM FOR CENTER PIVOT IRRIGATION SYSTEMS

(71) Applicant: Kansas State University Research Foundation, Manhattan, KS (US)

(72) Inventors: Aaron Akin, Knoxville, TN (US); Danny H. Rogers, Manhattan, KS (US); Jonathan Aguilar, Garden City, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 277 days.

(21) Appl. No.: 16/852,703

(22) Filed: Apr. 20, 2020

(65) Prior Publication Data

US 2020/0331016 A1    Oct. 22, 2020

Related U.S. Application Data

(60) Provisional application No. 62/836,280, filed on Apr. 19, 2019.

(51) Int. Cl.
*B05B 12/00* (2018.01)
*A01G 25/16* (2006.01)
*A01G 25/09* (2006.01)

(52) U.S. Cl.
CPC .......... *B05B 12/008* (2013.01); *A01G 25/092* (2013.01); *A01G 25/16* (2013.01)

(58) Field of Classification Search
CPC ....... B05B 12/008; B05B 12/08; B05B 15/50; A01G 25/092; A01G 25/16
See application file for complete search history.

(56) References Cited

U.S. PATENT DOCUMENTS

| 5,228,469 A * | 7/1993 | Otten ........................ G01F 1/24 |
| | | 137/557 |
| 5,927,603 A * | 7/1999 | McNabb .............. A01G 25/167 |
| | | 239/69 |
| 10,561,078 B2 * | 2/2020 | Darnold ................ A01G 25/16 |
| 2002/0066810 A1 * | 6/2002 | Prandi .................... A01G 25/16 |
| | | 239/69 |
| 2002/0186614 A1 * | 12/2002 | Millward ................ B01F 23/54 |
| | | 366/167.1 |
| 2013/0253713 A1 * | 9/2013 | VanWagoner ......... G05B 19/43 |
| | | 700/284 |
| 2016/0106046 A1 * | 4/2016 | Lennard ................ A01G 25/16 |
| | | 239/728 |
| 2019/0297797 A1 * | 10/2019 | Nickerson ............ A01G 25/165 |

* cited by examiner

*Primary Examiner* — Chad G Erdman
(74) *Attorney, Agent, or Firm* — Hovey Williams LLP

(57) ABSTRACT

Monitoring systems for center pivot irrigation systems and methods of irrigating an agricultural crop using the irrigation systems are provided. The irrigation systems may comprise a plurality of in-canopy sprinklers. The monitoring systems are configured to detect an operational condition of the plurality of in-canopy sprinklers, including whether individual sprinkler heads have become detached from the irrigation system main line, or whether an individual sprinkler head has become clogged, and alert an operator with a time and/or location of the occurrence of an event associated with one or more of the sprinklers.

13 Claims, 4 Drawing Sheets

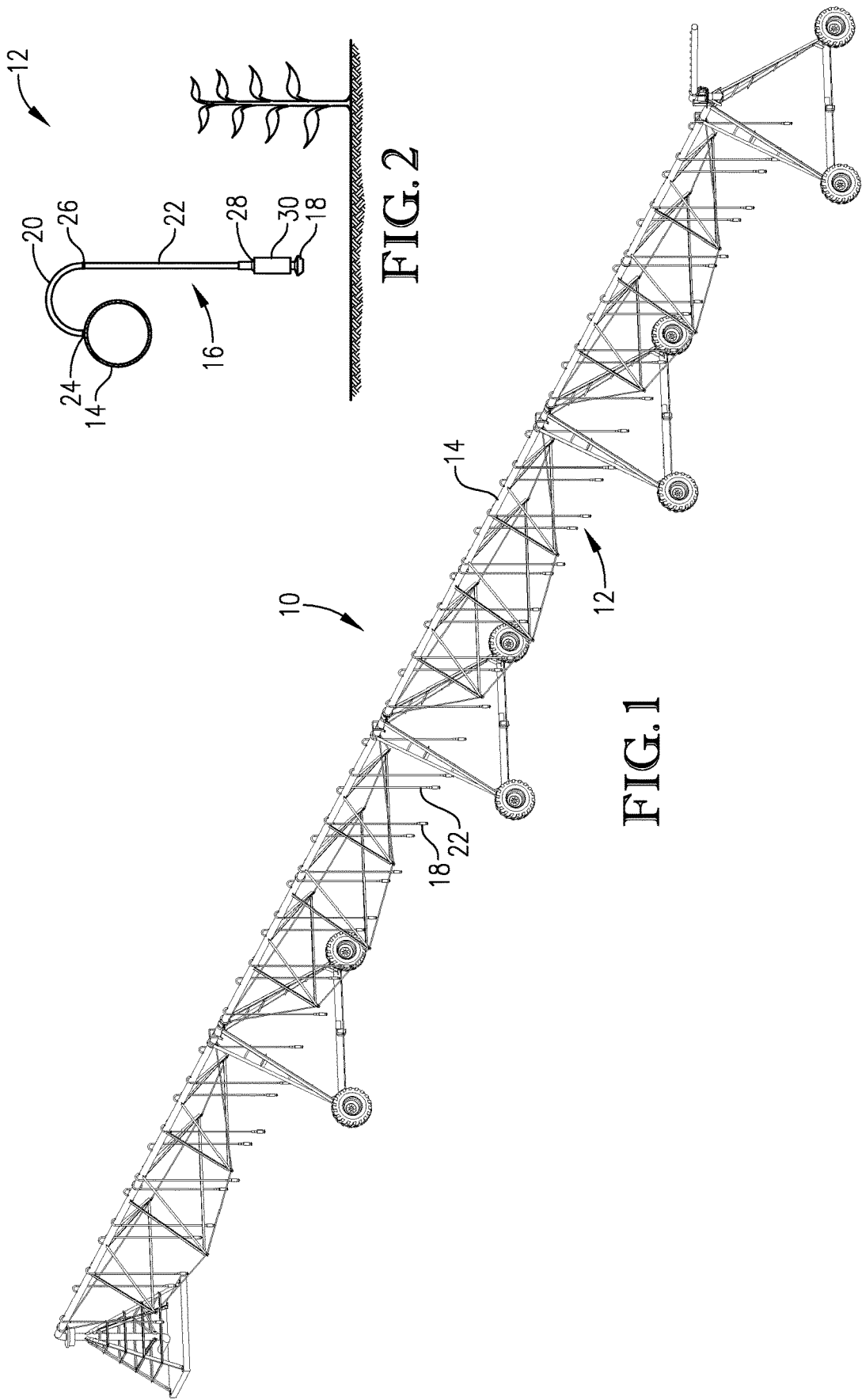

Sprinkler #1 is missing please replace immediately.
Approximate geographic location:
39.189814, -96.582842
Mar 17 6:48 PM Sprinkler #2 is missing please replace immediately.
Approximate geographic location:
39.189803, -96.582844
Mar 17 6:48 PM Sprinkler #3 is missing please replace immediately.
Approximate geographic location:
39.189797, -96.582845
Mar 17 6:48 PM

FIG. 5

IN-CANOPY SPRINKLER MONITORING SYSTEM FOR CENTER PIVOT IRRIGATION SYSTEMS

RELATED APPLICATION

This application claims the benefit of U.S. Provisional Patent Application No. 62/836,280, filed Apr. 19, 2020, which is incorporated by reference herein in its entirety.

STATEMENT REGARDING FEDERALLY SPONSORED RESEARCH

This invention was made with government support under Award No. 69-3A75-16-013 awarded by the USDA Natural Resources Conservation Service and Contract No. 58-3090-5-007 awarded by the USDA Agricultural Research Service. The government has certain rights in the invention.

BACKGROUND OF THE INVENTION

Field of the Invention

Embodiments of the present invention are directed toward monitoring systems for center pivot irrigation systems comprising a plurality of in-canopy sprinklers. The monitoring systems are configured to detect an operational condition of the plurality of in-canopy sprinklers, including whether individual sprinkler heads have become detached from the irrigation system main line, or whether an individual sprinkler head has become clogged.

Description of the Prior Art

Agricultural irrigation has become the dominant use of freshwater supplies accounting for approximately 70% of the world's withdrawn freshwater. In 2010, the United States alone used 115,000 million gallons of freshwater per day for agricultural irrigation. To preserve limited aquifer resources used for irrigation, especially in the U.S. Great Plains region, the irrigation industry has transitioned to more water efficient and uniform center pivot irrigation systems.

Center pivot irrigation systems with in-canopy sprinklers are commonly used to provide efficient and uniform water irrigation for large-scale agricultural crop production. Conventional pivot systems include a lateral main line and a series of drop lines spaced along the main line. Each drop line has a sprinkler head positioned below the main line to discharge water. Current in-canopy sprinkler packages allow center pivot irrigation systems to operate more efficiently and uniformly.

However, prior art in-canopy irrigation systems have various deficiencies. For instance, prior art in-canopy sprinklers hang low in the canopy and have the potential to become entangled in crop biomass and detach from the center pivot. Thus, prior art in-canopy irrigation systems are prone to having one or more sprinkler heads become detached from the system main line (e.g., due to the drop line breaking and/or the sprinkler head separating from the drop line). A detached sprinkler head permits excessive water to flow from the corresponding drop line, while reducing water supply to adjacent sprinkler heads. This results in decreased crop yields, excessive runoff, soil erosion, anaerobic soil conditions, and deep percolation of nutrients. The current method to detect missing in-canopy sprinklers is manual inspection along the span of the center pivot, which requires significant time and labor. The sprinkler heads of prior art in-canopy systems are also prone to becoming plugged, which can greatly restrict water flow from the sprinkler head or preclude water flow entirely. Because of the sprinklers hang low in the canopy, it is normally difficult for producers to quickly detect and replace clogged in-canopy sprinklers. Thus, a need exists for a monitoring system that alerts producers when an in-canopy sprinkler becomes detached or becomes clogged so that the irrigation system can be promptly repaired before uniformity issue arise.

SUMMARY OF THE INVENTION

Embodiments of the present invention are directed to addressing the aforementioned needs by providing an irrigation system equipped with a sprinkler monitoring system that is able to promptly alert a producer to malfunctions in the operation of the irrigation system.

According to one embodiment of the present invention there is provided an agricultural irrigation system comprising an irrigation main line, one or more sprinkler heads operably coupled to the irrigation main line by one or more respective sprinkler lines, and a sprinkler monitoring system that is operable to detect an operating condition of the one or more sprinkler heads.

According to yet another embodiment of the present invention there is provided an agricultural irrigation system comprising an irrigation main line that is connected to a source of water, a plurality of in-canopy sprinkler heads operably coupled to the irrigation main line by a plurality of respective sprinkler lines, and a sprinkler monitoring system that is operable to detect at least one of a state of attachment of the plurality of in-canopy sprinkler heads to the plurality of respective sprinkler lines and a flow rate of water through each of the plurality of in-canopy sprinkler heads. The sprinkler monitoring system comprises at least one sprinkler sensor associated with each of the plurality of in-canopy sprinkler heads, a master controller node, one or more sprinkler nodes coupled with the sprinkler sensors, and a digital compass node operable to detect the compass bearing of the irrigation system's path of travel.

According to still another embodiment of the present invention there is provided a method of irrigating an agricultural crop. The method comprises delivering a stream of water to a center pivot irrigation system. The center pivot irrigation system comprises an irrigation mainline, one or more sprinkler heads operably coupled to and spaced along the irrigation mainline by one or more respective sprinkler lines, and a sprinkler monitoring system that is operable to detect an operating condition of the one or more sprinkler heads. Water is dispensed from the irrigation mainline, into the one or more sprinkler lines, out of the one or more sprinkler heads, and onto the agricultural crop. The sprinkler monitoring system is used to detect at least one of a flow rate of water through the one or more sprinkler heads and the state of attachment of the one or more sprinkler heads to the one or more respective sprinkler lines. An operator is alerted using the sprinkler monitoring system upon occurrence of at least one of a detachment of one or more sprinkler heads from the one or more respective sprinkler lines and a change in the water flow rate through the one or more sprinkler heads.

BRIEF DESCRIPTION OF THE DRAWINGS

FIG. 1 is an illustration of a center pivot irrigation system;

FIG. 2 is a schematic depiction of an in-canopy sprinkler assembly extending from a center pivot main line;

FIG. 5 is an exemplary text message sent to a system operator detailing which in-canopy sprinklers are missing and their approximate location.

DETAILED DESCRIPTION OF THE PREFERRED EMBODIMENT

Figure 3:
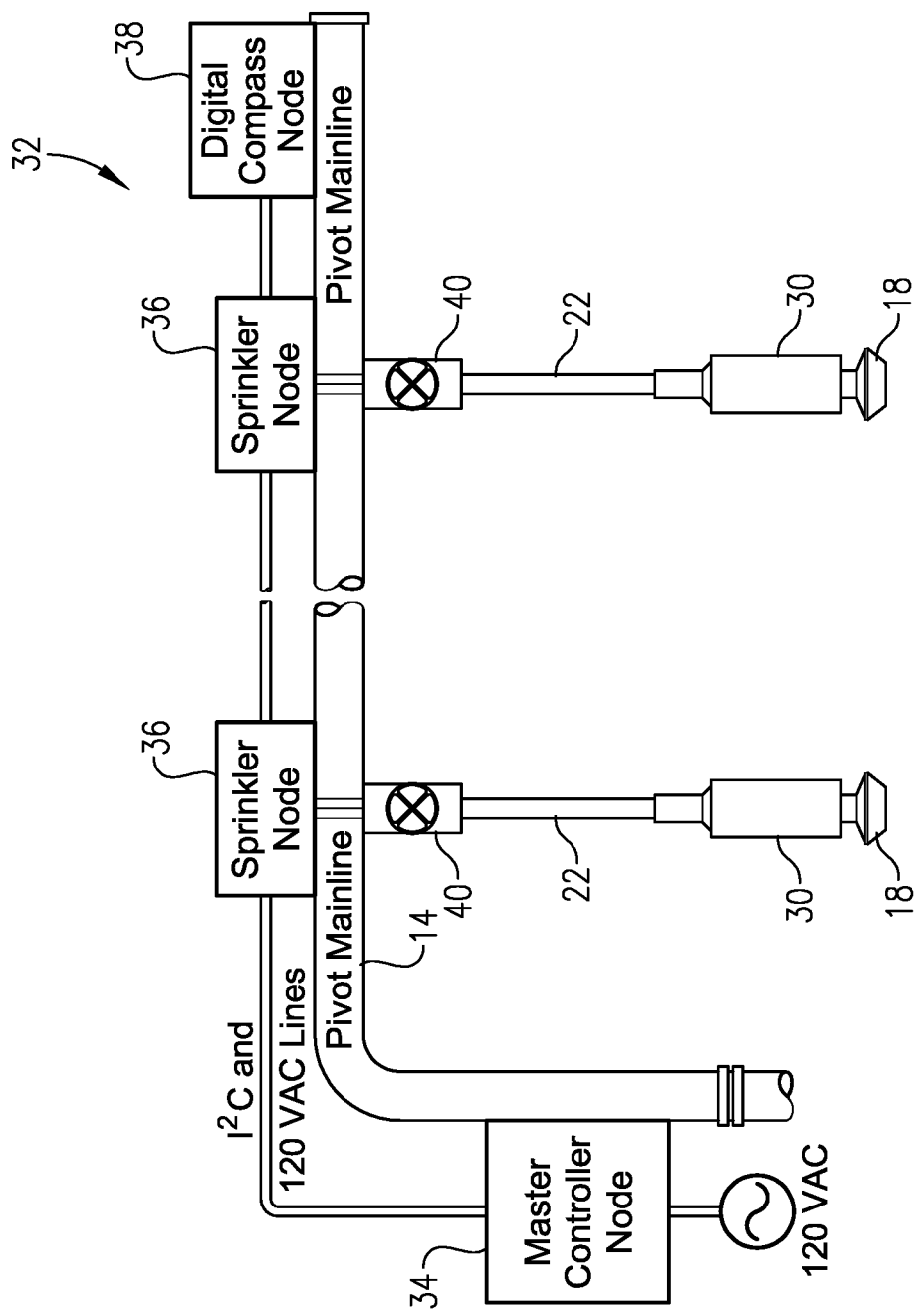
FIG. 3 is a schematic diagram of a sprinkler monitoring system comprising a flow meter associated with individual sprinklers.

Generally, an agricultural irrigation system is configured to dispense water efficiently and uniformly to a field in which crops are being grown. Agricultural irrigation systems according to certain embodiments of the present invention are configured to monitor themselves via a sprinkler monitoring system and determine, for example, if irrigation sprinkler heads become detached or clogged. According to other embodiments, the present invention is directed toward methods of irrigating an agricultural crop using a center pivot irrigation system comprising one or more sprinkler heads and a sprinkler monitoring system to ensure proper operation of the sprinkler heads.

Turning to FIG. 1, an exemplary center pivot irrigation system 10 is illustrated. The center pivot system 10 preferably comprises an irrigation device that provides one or more in-canopy sprinklers 12. The use of in-canopy sprinklers 12 enables the center pivot system 10 to dispense water efficiently and uniformly across a field. The center pivot system 10 preferably includes, among other things, a main line 14, a plurality of sprinkler lines 16, and a plurality of sprinkler heads 18. Water is delivered to the center pivot system 10 from a source of fresh water, such as a well, and introduced into the main line 14. The main line 14 then distributes the water along the span thereof and into the plurality of sprinkler lines 16. The water is then dispensed from sprinkler heads 18 onto the agricultural crop.

In certain embodiments, each sprinkler line 16 preferably includes a curved gooseneck line 20 and a drop hose 22 (see FIG. 2). The gooseneck line 20 is attached to a port 24 presented by the main line 14 and extends transversely from the main line to an outlet end 26. The drop hose 22 is attached to the outlet end 26 and extends downwardly therefrom to a sprinkler end 28 spaced below the main line 14. The sprinkler heads 18 are attached to the sprinkler end 28 of corresponding sprinkler lines 16. A weight 30 may be attached to drop hose 22 in order to appropriately position the sprinkler head 18 in a downward facing direction during use. Additional preferred and alternative features of the center pivot system 10 are described below.

Although the depicted center pivot system 10 is preferred, it is within the scope of the present invention for an alternative irrigation device to be used. For instance, the center pivot system could have an alternative configuration of in-canopy sprinklers 12. For some aspects of the present invention, the irrigation system 10 could have a sprinkler configuration other than in-canopy sprinklers.

Figure 4:
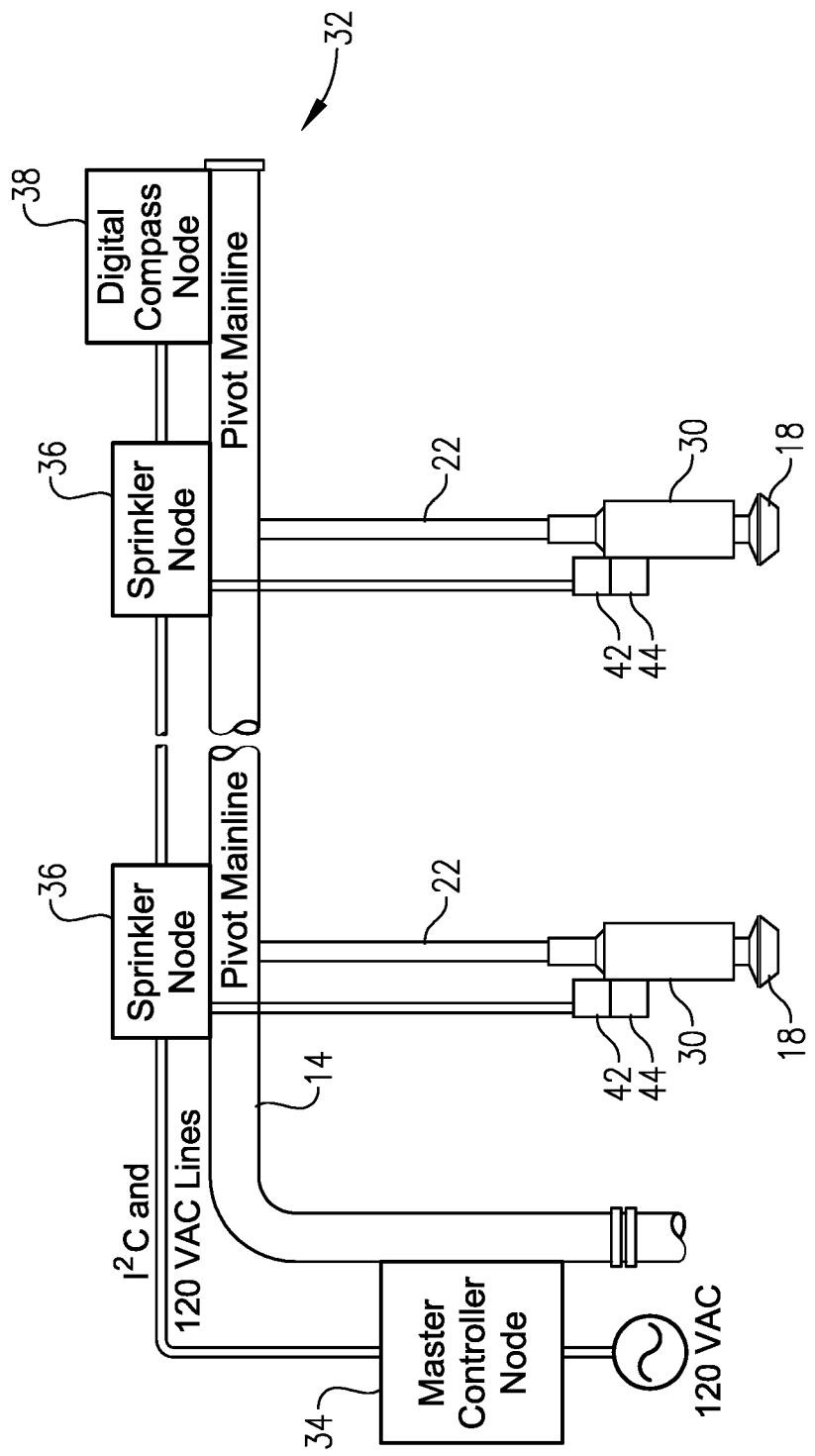
FIG. 4 is a schematic diagram of a sprinkler monitoring system comprising a switch assembly associated with individual sprinkler heads to detect detachment of the head from the sprinkler drop hose.

Exemplary sprinkler monitoring systems according to embodiments of the present invention are depicted in FIGS. 3 and 4. The monitoring systems 32 broadly include a master controller node 34, one or more sprinkler nodes 36 that are operable to monitor the operation of each in-canopy sprinkler 12, a digital compass node 38 operable to detect the compass bearing of the center pivot system 10, and one or more sprinkler sensors associated with the sprinkler heads 18 that are operable to detect an operating condition of each sprinkler head 18. Accordingly, methods of irrigating an agricultural crop according to the present invention include detecting at least one of a flow rate of water through the one or more sprinkler heads 18 and the state of attachment of the one or more sprinkler heads 18 to the one or more respective sprinkler lines 16. If the sprinkler monitoring system 32 detects detachment of one or more sprinkler heads 18 from the one or more respective sprinkler lines 16 and/or a change in the water flow rate through the one or more sprinkler heads 18, the center pivot system operator can be alerted so that necessary repairs can be made.

As depicted in FIG. 3, the one or more sprinkler sensors comprise flow meters 40 that are positioned in the sprinkler lines 16 between the main line 14 and the sprinkler heads 18. In this embodiment, the monitoring system 32 is configured to detect if one or more of the sprinkler heads 18 have become clogged or otherwise exhibit flow characteristics indicative of a malfunction and alert the system operator accordingly by transmitting a message, such as an SMS text message. As depicted in FIG. 4, the one or more sprinkler sensors comprise switches 42 that are configured to change the configuration of an electrical circuit upon detachment of a sprinkler head 18 from the center pivot system 10. The monitoring system 32 transmits the time and location that a sprinkler head 18 or drop hose 22 becomes detached from the main line 14. All components of the system 32 can be joined over an I$^2$C bus and mounted inside a weatherproof housing. It is noted that use of an I$^2$C bus is an exemplary communication protocol that could be utilized in monitoring systems 32 according to the present invention. It is within the scope of the present invention for a variety of wired and wireless communication protocols to be used for communication between system components.

The master controller node 34 manages the entire system by monitoring and requesting data from all nodes while communicating pertinent information to the user. In an exemplary embodiment, the master controller node 34 comprises two processors (e.g., an Arduino MKR GSM 1400 processor and an Arduino Uno processor) connected through a bi-directional logic level converter (e.g., CYT1076). The logic level converter allows the Arduino MKR GSM 1400 processor to communicate with the digital compass node 38 and the sprinkler nodes 36 of the monitoring system 32.

The master controller node program is configured to perform one or more of the following functions. The program checks the status of all sprinkler nodes 36, calculates the coordinates of any detached in-canopy sprinklers 12, checks the I$^2$C bus for any missing sprinkler nodes 36, requests compass bearing angle from the digital compass node 38, reads and responds to applicable text messages sent to the system via a traditional cellular network, and reports any detached or clogged in-canopy sprinklers 12 in addition to malfunctioning nodes to the end user via a text message. Table 1 provides exemplary system responses to received text messages.

TABLE 1

| Received Text Message | System Response |
|---|---|
| Sprinkler | Checks the status of all sprinkler nodes and their attached in-canopy sprinklers and reports any missing components to the user. |
| Help | Sends the user a text message outlining what text messages, when sent to the system, will |

TABLE 1-continued

| Received Text Message | System Response |
| --- | --- |
| | generate a system response. |
| Compass | Responds with text message informing the user of current center pivot compass bearing. |
| One | Pauses the system for 1 minute and sends a text message informing the user of this. |
| Five | Pauses system for 5 minutes and sends a text message informing the user of this. |

If a detached in-canopy sprinkler 12 is reported, the master controller node 34 calculates the approximate geographic coordinates in decimal degrees format of the detachment site before reporting this information to the user. This coordinate pair is calculated using the coordinates of the rotational center of the center pivot 10, the radius from the rotational center for the in-canopy sprinkler 12, and the current compass bearing angle. In an exemplary embodiment, the coordinates of the detachment site are calculated as a long integer since the level of precision of 6 decimal places necessary for accurate coordinates in decimal degree format may not be possible for certain microcontrollers, such as that found on most Arduino boards. In such an embodiment, a latitude of 39.189826 would be denoted as 39189826.

Additionally, to calculate the coordinates of the detachment site, a reference to the length of one degree of latitude and longitude is required. This length is a function of latitude and can be calculated using equations (1) and (2) below where $m_{DDLAT}$ and $m_{DDLON}$ are the change of one degree of latitude and longitude per meter, respectively, and Center Latitude is the latitude in decimal degrees format of the rotational center of the center pivot. The coefficients found in both equations ensure that the final value has been converted to the long integer format required by the program.

$$m_{DDLAT} = 0.00114 * \text{Center Latitude}^2 - 0.02439 * \text{Center Latitude} + 11.284 \quad (1)$$

$$m_{DDLON} = -3E-7 * \text{Center Latitude}^3 + 0.00005 * \text{Center Latitude}^2 - 0.00012 * \text{Center Latitude} + 11.057 \quad (2)$$

The $m_{DDLAT}$ and $m_{DDLON}$ values are set as permanent variables in the program to be utilized by the master controller node during normal operation. If an in-canopy sprinkler is reported missing the coordinates of the detachment site are calculated in long integer format using equations (3) and (4) below where $Lat_{Sprinkler}$ and $Lon_{Sprinkler}$ are the latitude and longitude of the detachment site, $r_{Sprinkler}$ is the radius in meters from the rotational center the in-canopy sprinkler was attached, Center Latitude and Center Longitude are the latitude and longitude, respectively, of the rotational center in long integer format, and φ is the radian value of the current compass bearing angle.

$$Lat_{Sprinkler} = m_{DDLAT} * r_{Sprinkler} * \cos(\varphi) + \text{Center Latitude} \quad (3)$$

$$Lon_{Sprinkler} = m_{DDLON} * r_{Sprinkler} * \sin(\varphi) + \text{Center Longitude} \quad (4)$$

The $Lat_{Sprinkler}$ and $Lon_{Sprinkler}$ values are then edited as strings to place the decimal point in the correct position allowing the final coordinates to have 6 decimal place precision. The system then sends a text message via a cellular network to the user informing them which in-canopy sprinkler is missing and approximately where it can be located (see, FIG. 5).

The digital compass node 38 measures the center pivot system's compass bearing angle and reports this value to the master controller node 34. In an exemplary embodiment, the digital compass node 38 comprises two Arduino Uno boards (A and B), two 5V relays, and a digital compass module. The digital compass module, HMC5883L, senses 3-axis magnetic vectors necessary for calculating a compass bearing angle. These values are then reported over the I²C bus to Arduino Uno B which uses the digital compass module's associated libraries to convert the raw vector information into a usable bearing angle. This bearing angle is then transferred to Arduino Uno A over software serial communication protocols where it is then broken into a two-byte integer and transferred over the I²C bus to the master controller node 34. In alternative embodiments, a tilt-compensated digital compass module can be used to reduce error that gets introduced when the digital compass module is rotated off horizontal. Therefore, incorporating a tilt-compensated digital compass into the monitoring system 32 can result in more accurate compass bearing angles when the system 32 is calculating the geographic coordinates of detached in-canopy sprinkler heads 18.

The sprinkler node 36 is responsible for monitoring respective in-canopy sprinkler heads 18 and reporting any detachments to the master controller node 34. In certain embodiments, the sprinkler node 36 is configured to monitor up to four flowmeters 40 attached to individual in-canopy sprinklers 12 to ensure that the sprinklers are operating within their designed limits. With four flowmeters per sprinkler node, the monitoring system 32 can be configured to monitor up to 444 in-canopy sprinklers, which enables monitoring of most center pivot irrigation systems 10.

However, one or more sprinkler nodes 36 could be configured to monitor an alternative number of sprinkler heads 18. For example, it is possible for each sprinkler node to monitor more than four sprinkler heads 18 using the appropriate circuitry and control algorithms (e.g., each sprinkler node 36 could monitor all of the sprinklers 12 on each span of the center pivot system 10). This can be accomplished by creating a unique response by each sprinkler node 36 to represent the detached in-canopy sprinkler head 18 instead of simply responding with either a value of "1" or "0". Additionally, the code of the master controller node 34 can be modified to properly analyze the incoming messages and match it to a missing in-canopy sprinkler head 18. If each sprinkler node 36 monitors two in-canopy sprinkler heads 18, the maximum number of in-canopy sprinkler heads the system 32 can monitor immediately doubles. This relationship expands linearly and can be adjusted to meet the specific number of in-canopy sprinklers found on the center pivot system 10 without spacing sprinkler nodes 36 too far apart.

In an exemplary embodiment, the sprinkler node 36 is controlled by an ATMEGA 328-PU microcontroller. Normally, this microcontroller is limited to two interrupt pins, which are the inputs necessary for monitoring flowmeters. However, by using a series of transistors, the microcontroller can switch between two flowmeter inputs per interrupt pin. In one or more embodiments, the sprinkler node 36 also comprises a relay shield that prevents the master controller node from becoming unresponsive if the sprinkler node becomes unpowered. In one or more other embodiments, the board will automatically disconnect from the I²C bus when power is lost due to two transistors between the I²C inputs and the SDA and SCL input pins. This keeps the master controller node 34 from becoming unresponsive if the sprinkler node 36 loses power. The board can be accessed and programmed using an FTDI 232 chip that connects to the corresponding FTDI input headers on the board.

It is also within the scope of the present invention for customized printed circuit boards (PCBs) to be used in place of the separate sprinkler and digital compass nodes described above, which comprise commercially available boards. These customized PCBs would allow the overall cost of the monitoring system to decrease because mass produced PCBs incorporating only necessary electrical components are often much cheaper substitutes than purchasing commercially available boards and peripherals separately. It would also allow the assembly of these nodes to be less complex as most connections would already be etched into the PCBs.

Referring again to FIG. 3, the sprinkler sensors each preferably comprise a flow meter 40 that is operable to measure the water flow rate through the corresponding sprinkler line 16. The flow meter 40 may include a housing, a pinwheel rotatably mounted in the housing, and a hall effect magnet sensor operably coupled to the pinwheel. It will be appreciated that the flow meter 40 is configured to detect detachment of the sprinkler head 18 (associated with an abnormally-high water flow rate) or clogging of the sprinkler head 18 (associated with an abnormally-low water flow rate or no water flow).

An exemplary flow meter 40 is a Liquid Flow Meter—Plastic ½" NPS Threaded, PRODUCT ID: 828, sold by Adafruit Industries. However, various types of flow meters could be used. For instance, the sprinkler sensor could include an ultrasonic flow meter that uses the Doppler effect to sense particulate flow using a receiving element. Such sensors would be mounted externally to the water line and would generally rely on particulates or bubbles in the flow to operate accurately. Furthermore, one or more sprinkler sensors could include another type of sensor to measure flow, such as a pressure sensor, a rotameter (i.e., variable area flow meter), a spring-and-piston flow meter, a vortex meter, pitot tube, differential pressure sensor, electromagnetic flow meter, or a positive displacement flow meter.

Referring again to FIG. 4, the sprinkler sensor illustrated is a switch, namely a magnetic reed switch 42. In this embodiment, the reed switch 42 is in an open configuration when the sprinkler head 18 is attached to the drop hose 22. The switch closes when the head 18 detaches, thus alerting the operator to the detachment.

In certain embodiments, the sprinkler node program setup begins by digitally writing pins 4 through 7 as "HIGH" to ensure that all relays on the relay shield remain powered. The program then joins the sprinkler node 36 to the I²C bus with an address matching the in-canopy sprinkler head 18 it is monitoring. When the master controller node 34 requests data from the sprinkler node 36 over the I²C bus, it responds with an integer value of a "1" or a "0". If the in-canopy sprinkler head 18 or drop hose 22 is detached from the center pivot main line 14, the integer value sent to the master controller node is "1".

The principles of the present invention are also applicable where each of multiple sprinkler heads 18 is associated with a combination of sensors to provide suitable monitoring of the respective sprinkler head operation (e.g., to monitor whether the sprinkler head has become detached or clogged). For instance, each sprinkler head 18 could be associated with a corresponding flow meter 40 and a corresponding pressure meter (e.g., where the combination cooperatively monitors detachment and clogging of the respective sprinkler head).

In alternative embodiments, a magnetic reed switch 42 and magnet 44 combination is secured above the in-canopy sprinkler head 18 where it is attached to the drop hose 22 (FIG. 4). The magnetic reed switch 42 and magnet 44 combination may be mounted at a crimp connection that mounts the sprinkler head 18 to the rest of the drop hose 22. In certain embodiments, the magnet 44 is secured to the in-canopy sprinkler head 18 directly below the magnetic reed switch 42. The magnetic reed switch 42 can then be electrically coupled (wired or wirelessly) to the process of the respective sprinkler node 36 through a breakaway plug, for example. Half of the breakaway plug could be connected to the sprinkler node 36 processor, which can be secured to the main line 14, while the other half of the breakaway plug is secured to the drop hose 22. This allows the sprinkler node 36 to register any detachments from the in-canopy sprinkler head 18 or drop hose 22 since a loss of either component will result in the same loss of signal detected by sprinkler node's processor. The inclusion of break-away plugs between the drop hose 22 and the center pivot main line 14 allows the system 32 to also detect detachments of the drop hose 22 or gooseneck line 20 from the center pivot main line 14.

Although not depicted, the magnetic reed switch 42 for each sprinkler head 18 could be used in combination with one or more other sensors. For example, each sprinkler head 18 could be associated with a corresponding flow meter 40 and a corresponding magnetic reed switch 42. Such a combination could be used to cooperatively monitor detachment and clogging of the respective sprinkler head 18.

If the system includes solenoid valves or any type of controllable valve attached to the drop hose 22, the circuit and control algorithm of at least one sprinkler node 36 can be configured to automatically shut off a sprinkler head 18 once a detachment or plugged condition is detected. If the monitoring system 32 is coupled with controllable valves on each of the sprinkler heads 18, the system could be adapted for additional applications. For example, the system 32 could be configured to provide variable rate irrigation (controlling spatially the amount of water applied across a field to meet changing conditions across a field, so that water is applied only where needed), monitoring of chemigation or fertigation (using the center pivot to apply chemicals or fertilizer to the field), and variable rate controlled chemigation and fertigation.

In certain embodiments, monitoring system 32 may also have the ability to warn the user if wire theft has occurred. By designing the master controller node 34 to alert the user if sprinkler nodes 36 have had their I²C communication lines disconnected or have lost power during normal operation, the system 32 can indirectly detect wire theft. If wires connecting the sprinkler nodes 36 to the master controller node 34 are cut, the user will receive a near immediate response from the system detailing which sprinkler nodes 36 are unavailable.

Also, in certain embodiments, system 32 can remotely sense center pivot rotational direction. With the incorporation of the "compass" message option in the user interface, users can request the current center pivot compass bearing angle. If a user wishes to remotely sense the direction the center pivot system is rotating, they would simply need to call this function a few minutes apart and compare the responses. If the bearing angle increases between the two messages, then the center pivot is moving in a clockwise direction. Inversely, if the bearing angle decreases between the two messages then the center pivot is moving in a counterclockwise direction. These relationships hold true except if the center pivot crosses North (0°) between the two messages.

In further embodiments, the monitoring system 32 may incorporate a watchdog timer. The purpose of a watchdog timer is to reset a computerized system if an error arises that causes the system to become unresponsive or prevents the system from carrying out normal functions. This component can be embedded into the master controller node 34 and would check for signals from the node. Anytime a signal is received, the watchdog timer resets its countdown. If the master controller node 34 fails to check in before the countdown elapses, the watchdog timer would reset the master controller node 34 and restart the countdown. The watchdog timer allows the system an additional level of automatic repair preventing the user from needing to physically restart the system anytime a system breaking error occurs.

It will be appreciated that the various embodiments described herein are not necessarily mutually exclusive unless otherwise indicated herein. For example, a feature described or depicted in one embodiment may also be included in other embodiments but is not necessarily included. Thus, the present invention encompasses a variety of combinations and/or integrations of the specific embodiments described herein.

We claim:

1. A center pivot agricultural irrigation system comprising:
    an irrigation main line that is connected to a source of water;
    a plurality of in-canopy sprinkler heads operably coupled to the irrigation main line by a plurality of respective sprinkler lines; and
    a sprinkler monitoring system that is operable to detect at least a state of attachment of the plurality of in-canopy sprinkler heads to the plurality of respective sprinkler lines and/or a state of attachment of the plurality of sprinkler lines to the irrigation main line,
    the sprinkler monitoring system comprising a plurality of sprinkler sensors, each of the plurality of sprinkler sensors being associated with a respective one of the plurality of in-canopy sprinkler heads, a master controller node, one or more sprinkler nodes coupled with the sprinkler sensors, and a digital compass node operable to detect the compass bearing of the irrigation system's path of travel,
    wherein the plurality of sprinkler sensors comprises a plurality of sprinkler head detachment sensors configured to detect detachment of each of the sprinkler heads from its respective sprinkler line, the sprinkler head detachment sensor comprising a switch operable to open or close a sensor circuit upon detachment of the sprinkler head from its respective sprinkler line,
    the sprinkler monitoring system being configured to detect a detachment of any of the plurality of in-canopy sprinkler heads from its respective sprinkler line and/or of any of the plurality of sprinkler lines to the irrigation main line and record a time that and a location where the in-canopy sprinkler head and/or sprinkler line detaches.

2. The agricultural irrigation system of claim 1, wherein the plurality of sprinkler lines comprises a gooseneck line that is attached to the irrigation main line and a drop hose that extends between the gooseneck line and the sprinkler head.

3. The agricultural irrigation system of claim 1, wherein the plurality of sprinkler sensors is operable to sense a characteristic of fluid flow through the one or more sprinkler heads and/or through the one or more sprinkler lines.

4. The agricultural irrigation system of claim 1, wherein the sprinkler monitoring system further comprises a watchdog timer configured to receive a signal from the master controller node and reset the master controller node if no signal is received therefrom for a predetermined period of time.

5. The agricultural irrigation system of claim 1, wherein the digital compass node comprises a tilt-compensated digital compass node.

6. The agricultural irrigation system of claim 1, wherein the one or more sprinkler nodes and the digital compass node are contained on a common printed circuit board.

7. The agricultural irrigation system of claim 3, wherein the plurality of sprinkler sensors comprises a plurality of flow meters operable to measure the rate of water flowing through each of the sprinkler heads and/or through each of the sprinkler lines.

8. The agricultural irrigation system of claim 7, wherein the sprinkler monitoring system is configured to record a time and a location of any of the plurality of sprinkler heads upon detection of a reduced fluid flow rate to any of the sprinkler heads by the respective sprinkler sensor.

9. The agricultural irrigation system of claim 7, wherein the sprinkler monitoring system is configured to record a time and a location of any of the plurality of sprinkler lines upon detection of a reduced fluid flow rate through any of the sprinkler lines by the respective sprinkler sensor.

10. A method of irrigating an agricultural crop comprising:
    delivering a stream of water to a center pivot irrigation system, the center pivot irrigation system comprising an irrigation main line that is connected to a source of water, a plurality of in-canopy sprinkler heads operably coupled to and spaced along the irrigation main line by a plurality of respective sprinkler lines, and a sprinkler monitoring system comprising a plurality of sprinkler sensors, the sprinkler monitoring system being operable to detect at least a state of attachment of the plurality of in-canopy sprinkler heads to the plurality of respective sprinkler lines and/or a state of attachment of the plurality of sprinkler lines to the irrigation main line,
    wherein the plurality of sprinkler sensors comprises a plurality of sprinkler head detachment sensors configured to detect detachment of each of the sprinkler heads from its respective sprinkler line, the sprinkler head detachment sensor comprising a switch operable to open or close a sensor circuit upon detachment of the sprinkler head from its respective sprinkler line;
    dispensing water from the irrigation mainline, into the plurality of sprinkler lines, out of the plurality of sprinkler heads, and onto the agricultural crop;
    detecting with the sprinkler monitoring system at least a state of attachment of each of the plurality of sprinkler heads to the plurality of respective sprinkler lines and/or a state of attachment of each of the plurality of sprinkler lines to the irrigation main line; and
    alerting an operator using the sprinkler monitoring system upon at least a detachment of any of the plurality of sprinkler heads from its respective sprinkler lines and/ or of a detachment of any of the plurality of sprinkler lines from the irrigation main line and transmit to the operator a time that and a location where the detachment occurred.

11. The method of claim 10, wherein the detecting step further comprises detecting a decrease in the flow rate of water through at least one of the plurality of sprinkler heads and/or through at least one of the plurality of sprinkler lines, and the alerting step further comprises transmitting a message to the operator that at least one of the plurality of sprinkler heads and/or at least one of the plurality of sprinkler lines are clogged.

12. The method of claim 10, wherein the plurality of sprinkler sensors comprises a plurality of flow meters operable to measure the rate of water flowing through each of the sprinkler heads and/or through each of the sprinkler lines, and wherein the detecting step comprises detecting a change in water flow rate through at least one of the plurality of respective sprinkler heads and/or through at least one of the plurality of sprinkler lines indicating detachment of the respective in-canopy sprinkler head or sprinkler line.

13. The method of claim 10, wherein the plurality of sprinkler sensors comprises a plurality of sprinkler line detachment sensors configured to detect detachment of each of the sprinkler lines from the irrigation main line, the sprinkler line detachment sensor comprising a switch operable to open or close a sensor circuit upon detachment of the sprinkler line from the irrigation main line.

* * * * *